(12) United States Patent
Macpherson et al.

(10) Patent No.: US 6,600,633 B2
(45) Date of Patent: Jul. 29, 2003

(54) THERMALLY CONDUCTIVE OVERMOLD FOR A DISC DRIVE ACTUATOR ASSEMBLY

(75) Inventors: Aaron Steve Macpherson, Ft. Collins, CO (US); Rishi Kant, Boulder, CO (US); Gary F. Kelsic, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/000,862

(22) Filed: Oct. 24, 2001

(65) Prior Publication Data

US 2002/0167763 A1 Nov. 14, 2002

Related U.S. Application Data

(60) Provisional application No. 60/290,093, filed on May 10, 2001.

(51) Int. Cl.$^7$ ............................................. G11B 5/55
(52) U.S. Cl. .......................................... 360/265.8
(58) Field of Search ............................ 360/265.7, 265.8

(56) References Cited

U.S. PATENT DOCUMENTS

| | | | |
|---|---|---|---|
| 4,544,973 A | 10/1985 | Van De Bult |
| 4,775,908 A | 10/1988 | Ycas |
| 4,780,776 A | 10/1988 | Dushkes |
| 4,967,291 A | 10/1990 | Touchton et al. |
| 4,988,903 A | 1/1991 | Koriyama |
| 5,031,059 A | 7/1991 | Yamaguchi et al. |
| 5,136,439 A | 8/1992 | Weispfenning et al. |
| 5,184,265 A | 2/1993 | Foote et al. |
| 5,232,970 A | 8/1993 | Solc et al. |
| 5,247,410 A | 9/1993 | Ebihara et al. |
| 5,262,907 A | 11/1993 | Duffy et al. |
| 5,268,414 A | 12/1993 | Nakai et al. |
| 5,371,134 A | 12/1994 | Inoue |
| 5,404,258 A | 4/1995 | Arin et al. |
| 5,517,372 A | 5/1996 | Shibuya et al. |
| 5,585,981 A | 12/1996 | Lee |
| 5,600,516 A | 2/1997 | Phillips et al. |
| 5,621,591 A | 4/1997 | Rahimi et al. |
| 5,650,896 A | 7/1997 | Viskochil |
| 5,660,917 A | 8/1997 | Fujimori et al. |
| 5,666,052 A | 9/1997 | Sata |
| 5,672,927 A | 9/1997 | Viskochil |
| 5,673,013 A | 9/1997 | Moody et al. |
| 5,681,883 A | 10/1997 | Hill et al. |
| 5,694,268 A | 12/1997 | Dunfield et al. |
| 5,696,649 A | 12/1997 | Boutaghou |
| 5,766,507 A | 6/1998 | Nakai |
| 5,768,050 A | 6/1998 | Cho |
| 5,781,412 A | 7/1998 | de Sorgo |
| 5,894,382 A | 4/1999 | Hyde |
| 5,894,524 A | 4/1999 | Kotsatos et al. |
| 5,978,178 A | 11/1999 | Adley |
| 5,985,684 A | 11/1999 | Marshall et al. |
| 6,048,919 A | 4/2000 | McCullough |
| 6,057,989 A * | 5/2000 | Kaczynski et al. ...... 360/265.7 |
| 6,061,206 A | 5/2000 | Foisy et al. |
| 6,078,477 A | 6/2000 | Adams et al. |
| 6,091,578 A | 7/2000 | Stole et al. |
| 6,151,198 A | 11/2000 | Prater et al. |
| 6,162,849 A | 12/2000 | Zhuo et al. |
| 6,181,530 B1 | 1/2001 | Ratliff et al. |

FOREIGN PATENT DOCUMENTS

| | | |
|---|---|---|
| JP | 362147709 A | 7/1987 |
| JP | 363242158 A | 10/1988 |
| JP | 2073574 | 3/1990 |
| JP | 402168474 A | 6/1990 |
| JP | 2179974 | 7/1990 |
| JP | 402227883 A | 9/1990 |

* cited by examiner

*Primary Examiner*—Robert S. Tupper
(74) *Attorney, Agent, or Firm*—Fellers, Snider, et al.

(57) ABSTRACT

A thermally conducting and electrically insulating overmold encapsulates and supports an actuator coil in a disc drive assembly. The overmold is made from a base resin mixed with a ceramic filler compound such as boron nitride, alumina, aluminum nitride, magnesium oxide, zinc oxide, silicon carbide, beryllium oxide, chromium oxide or some combination thereof. The base resin is preferably polypheneline sulfide. Glass filler and/or a coupling agent are also preferably added. The overmold reduces off track read/write head position errors due to popping caused by thermal expansion and contraction of the actuator coil.

28 Claims, 3 Drawing Sheets

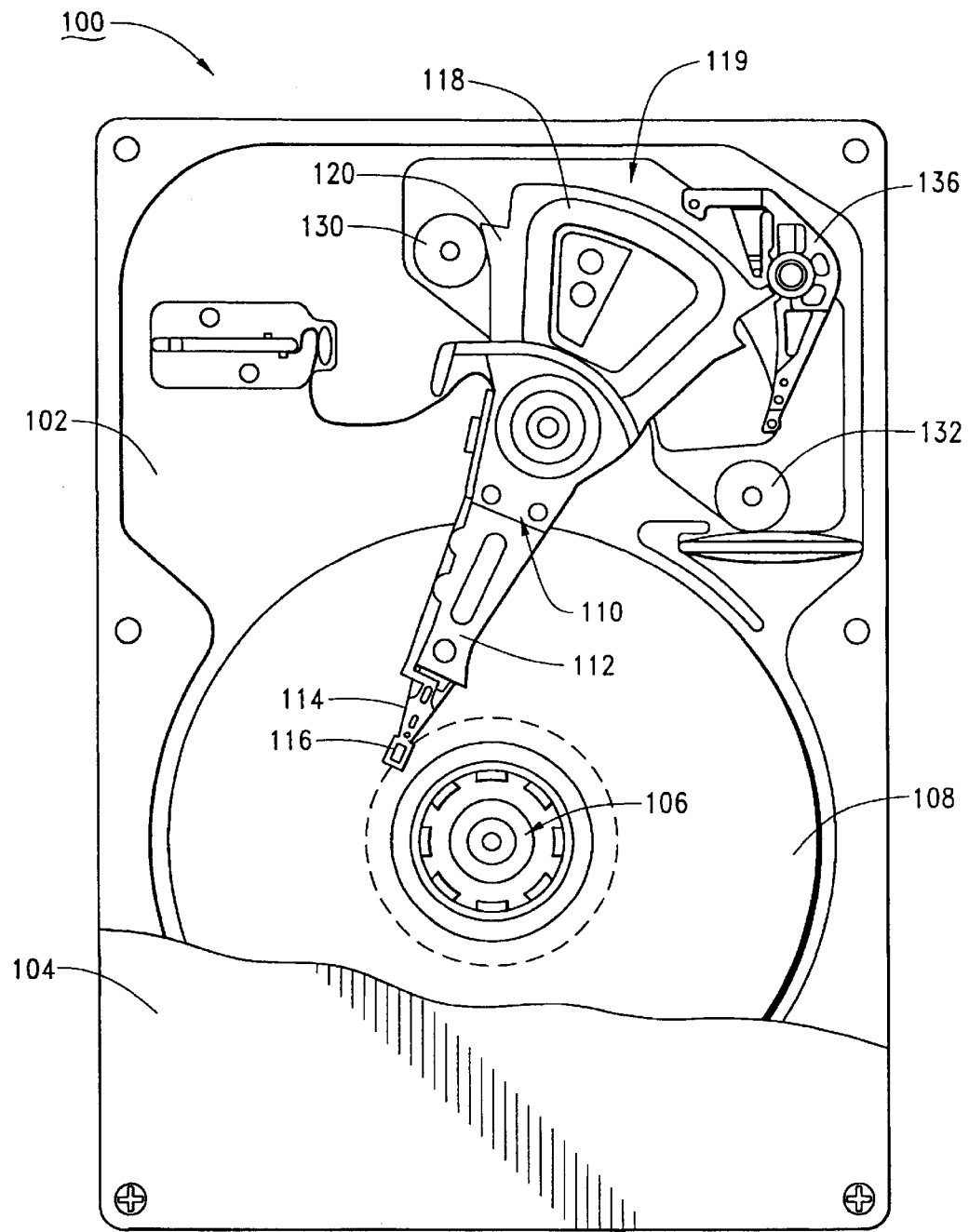
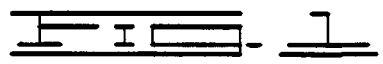

THERMALLY CONDUCTIVE OVERMOLD FOR A DISC DRIVE ACTUATOR ASSEMBLY

RELATED APPLICATIONS

This application claims the benefit of U.S. Provisional Application No. 60/290,093 filed May 10, 2001.

FIELD OF THE INVENTION

The claimed invention relates generally to disc drive data storage devices and more particularly to a novel overmold used to support a coil of an acutator used to move an array of read/write heads adjacent a corresponding number of disc recording surfaces.

BACKGROUND OF THE INVENTION

Data storage devices of the type known as "Winchester" disc drives are well known in the industry. These disc drives magnetically record digital data on circular, concentric data tracks on the surfaces of one or more rigid discs. The discs are typically mounted for rotation on the hub of a spindle motor. In disc drives of the current generation, the discs are rotated at speeds of up to 10,000 revolutions per minute.

Data are recorded to and retrieved from the discs by an array of vertically aligned read/write head assemblies, or heads, which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface. In order to maintain the proper flying relationship between the heads and the discs, the heads are attached to and supported by head suspensions or flexures.

Historically, the actuator assembly used to position the heads has assumed many forms. Most disc drives of the current generation incorporate an actuator of the type referred to as a rotary voice coil actuator. A typical rotary voice coil actuator includes a pivot shaft fixed to a disc drive housing base deck at a location adjacent an outer edge of the discs. The pivot shaft is mounted such that its central axis is normal to the plane of rotation of the discs. An actuator bearing housing is mounted to the pivot shaft by an arrangement of precision ball bearing assemblies. The actuator bearing housing supports a coil that is immersed in a magnetic field of permanent magnets. The permanent magnets are mounted to the disc drive housing base deck.

The actuator assembly also includes a centrally located E-block. On the side of the actuator bearing housing opposite the coil are a plurality of vertically aligned, radially extending actuator arms. The actuator arms and the coil are connected to the E-block. The flexures are mounted to the actuator arms. When current is applied to the coil, the coil produces a magnetic field that interacts with the magnetic field of the permanent magnets to pivot the actuator bearing housing about the pivot shaft, thereby moving the heads across the disc surfaces.

A closed loop servo system such as disclosed in U.S. Pat. No. 5,262,907 issued Nov. 16, 1993 to Duffy et al., assigned to the assignee of the present invention, is typically used to maintain the head position with respect to the data tracks. Such a servo system obtains head position information from servo data fields written to the tracks during disc drive manufacturing to maintain a selected head over an associated track during a track following mode of operation.

A seek mode of operation, which comprises the initial acceleration of a head away from an initial track and the subsequent deceleration of the head toward a destination track, is also controlled by the servo system. Such seek operations are typically velocity controlled, in that the velocity of the head is repetitively measured and compared to a velocity profile, with the current applied to the coil being generally proportional to the difference between the actual and profile velocities as the head is moved toward the destination track.

A continuing trend in the industry is to provide disc drives with ever increasing data storage and transfer capabilities. This trend has led to efforts to minimize the time required to perform a seek operation. A typical seek operation includes an initial overhead time during which the disc drive services its internal operations, a seek time during which the head is moved to and settled on the destination track, and a latency time during which the drive waits until a particular sector on the destination track reaches the head as the disc rotates relative to the heads.

Seek times have been minimized through the application of large amounts of current to the coil during acceleration and deceleration phases of a seek operation. However, as the current is increased, the electrical energy dissipated as heat by the coil also increases so that the temperature of the coil increases. As the coil temperature increases, the resistance of the coil increases and the magnitude of the control current is limited, which also adversely affects the seek time. Additionally, elevated coil temperatures can cause degradation of adhesive and insulating materials used in the construction of a voice coil motor (VCM).

Actuator overmolds have been used in disc drives of the existing art to support the coil and to dampen vibration. An actuator overmold is typically composed of liquid crystal polymer (LCP), thermoplastic, or thermoset plastic resin formed over portions of the actuator assembly. The actuator body, coil and other components are typically assembled, placed inside a mold having a mold cavity, and a thermoplastic is injected in the mold cavity.

A problem has arisen during a seek operation with some models because the heat generated by the coil causes the coil to become hot and expand. The heat generated by the coil heats the overmold which also expands, but at a different rate than the rate at which the coils expands. Following the seek operation, the coil and the overmold contract, also at different rates. As a result of the differential rates of expansion and contraction, stresses have developed between the coil and the overmold. These stresses are relieved suddenly by a "popping" which causes a sudden force to be internally generated within the actuator. This force can cause the heads to move "off track" and thereby caused data read and write errors.

The stresses caused by the differential rate of expansion are further exacerbated by the fact that glass/mineral filled polymer resins in an amorphous state exhibit a sudden increase in their coefficient of thermal expansion when their temperature reaches a glass transition temperature. The glass transition temperature marks the incipiency of relative motion between polymer chains causing them to store internal strain energy if the polymer is constrained in some manner. This change in the coefficient of thermal expansion is reversible unless the entire polymer becomes crystalline. Upon cooling of the overmold material, the stored energy becomes available when the temperature becomes lower than the glass transition temperature and results in popping.

Thus, there is a need for an improved actuator design that overcomes these and other limitations of the prior art.

SUMMARY OF THE INVENTION

In accordance with preferred embodiments, a thermally conducting and electrically insulating overmold is provided to encapsulate and support an actuator coil of a disc drive actuator assembly. The overmold is made from a base resin mixed with a ceramic filler compound of boron nitride, alumina, aluminum nitride, magnesium oxide, zinc oxide, silicon carbide, beryllium oxide, chromium oxide or some combination thereof. In some preferred embodiments, the base resin is a thermoplastic such as a liquid crystal polymer, polyethylene naphthalate, polyethylene terephthalate, polybutylene terephthalate, polyamide, polyphthalamide, polypheneline sulfide, polycarbonates, polyetheretheketones and polyphenyline oxide. In some embodiments, the overmold material includes a coupling agent and/or glass fiber.

The overmold material is preferably selected to be electrically insulative and thermally conductive, and to have a rate of thermal expansion that substantially matches that of the actuator coil to reduce head position errors due to popping (sudden force induced by the thermal expansion and contraction of the actuator coil).

These and various other features as well as advantages which characterize the claimed invention will become apparent upon reading the following detailed description and upon reviewing the associated drawings.

BRIEF DESCRIPTION OF THE DRAWINGS

FIG. 1 is a plan view of a disc drive constructed in accordance with preferred embodiments of the present invention.

DETAILED DESCRIPTION

Figure 2:
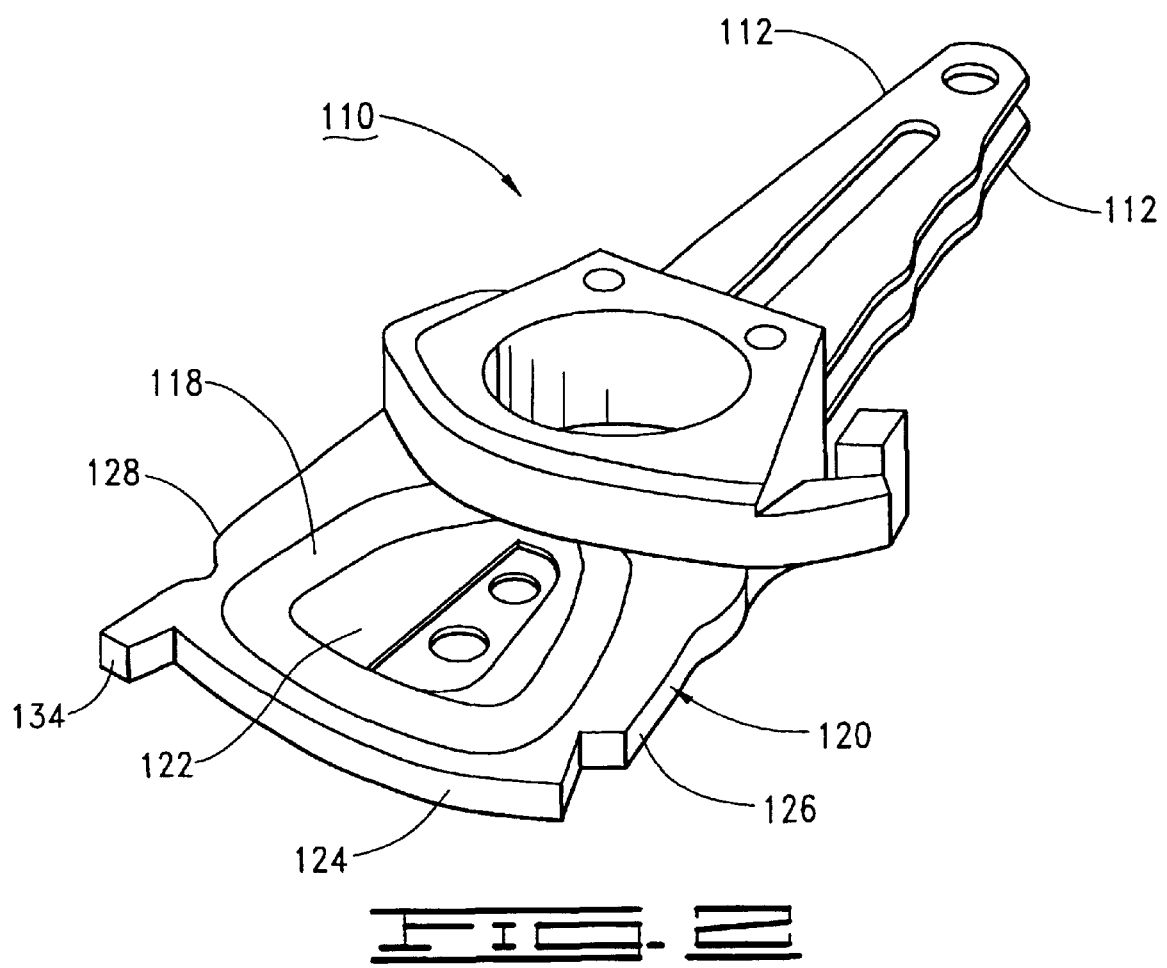
FIG. 2 is a perspective view of an actuator assembly in accordance with a preferred embodiment of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 at a constant, high speed.

An actuator E-block 110 includes a number of rigid actuator arms 112 which extend adjacent the disc surfaces. Flexible suspension assemblies 114 extend from the arms 112 to support an array of read/write heads 116. The actuator 110 is pivotally moved through the application of current to an actuator coil 118 of a voice coil motor (VCM) 119. The coil 118 is encapsulated in and attached to the actuator by way of an overmolded structure (overmold) 120.

FIG. 2 shows a perspective view of the actuator overmold 120 in greater detail. The overmold 120 includes an inner bobbin portion 122 disposed within the coil 118, and an outer portion 124 which surrounds the exterior of the coil 118. The inner and outer portions 122, 124 can be separate members, as shown, or alternatively can be integrally formed so that a portion of the overmold 120 extends across the coil 118 to connect the portions 122, 124. The outer portion 124 includes limit surfaces 126, 128 to contact limit stops 130, 132 (shown in FIG. 1) at radial extents of actuator travel.

The outer portion 124 further includes a latch arm 134 which engages a magnetic latch 136 (shown in FIG. 1) to latch the actuator 110. It will be understood that the particular configuration of the overmold 120 can vary depending on the requirements of a given application so that the embodiment shown in FIGS. 1 and 2 is for the purpose of illustration and is not limiting.

The overmold 120 is made from an overmold material that includes a base resin mixed with a ceramic filler compound. The base resin is preferably polypheneline sulfide (PPS), a liquid crystal polymer (LCP) compound or a thermoplastic polymer compound chosen from a class of compounds that include polyethylene naphthalate, polyethylene terephthalate, and polybutylene terephthalate. Other polymers that may be used as a base resin include polyamide, polyphthalamide, polycarbonates, polyetheretheketones and polyphenyline oxide.

In a preferred embodiment, the ceramic filler compound is boron nitride. In another preferred embodiment, the ceramic filler compound is alumina (or aluminum oxide). Other ceramic filler compounds can include aluminum nitride, magnesium oxide, zinc oxide, silicon carbide, beryllium oxide and chromium oxide. The ceramic filler compound can also be made from mixtures of selected ones of the ceramic filler compounds listed above. Preferably, the ceramic filler compound makes up 25% to 90% of the mass of the overmold material. The base resin typically makes up between 10% and 75% of the mass of the overmold material.

The coil 118 goes through several cycles of heating and cooling caused by different current demands during operation. The coil material, the actuator material and the overmold material have different compositions. As a result, these different parts have different coefficients of thermal expansion that cause the parts to expand and contract at different rates. This causes the overmold 120 to have a significant amount of strain energy. This strain energy is released as popping. In order to effectively prevent popping, the overmold material preferably has a thermal conductivity of at least 0.40 W/m-°K. to effectively dissipate heat generated by the application of current to the coil 118 and thereby prevent popping.

In some preferred embodiments, glass fiber is mixed with the base resin and the ceramic filler compound. In other preferred embodiments, the overmold material includes a coupling agent and/or dispersing agent (referred to herein as coupling agent). The coupling agent facilitates a better wetting of the ceramic filler compounds. The coupling agent also helps to reduce the melt viscosity of the overmold material and improves adhesion between the base resin and the ceramic filler compound. Coupling agents are well known in the art and include a neoalkoxy titanate coupling agent and monoalkoxy titanate coupling agent. The coupling agent typically makes up about 0.1% to 5% of the mass of the overmold material.

Besides providing structural support and vibration damping for the actuator, the overmold conducts heat away from the coil 118. This heat is transferred by convection to the air currents circulating in the disc drive housing. This prevents or lessens the stresses caused by the differential rates of expansion of the coil and the overmold, the occurrence of popping, and the read and write errors caused by the heads being moved off track by the popping.

Test Results

Figure 3:
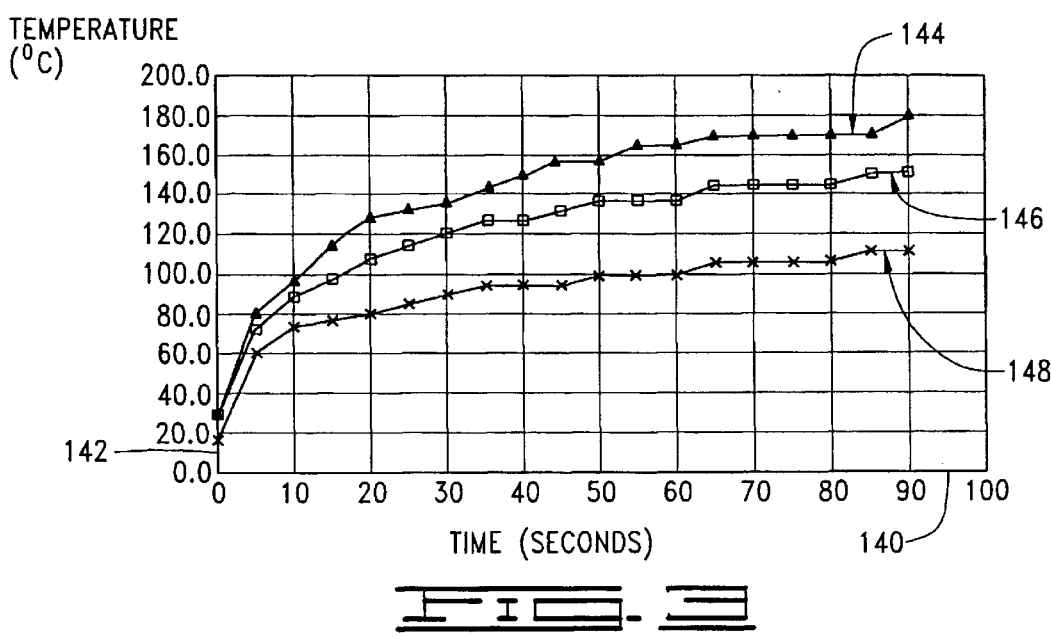
FIG. 3 is a plot of time versus temperature for a test to evaluate the heat dissipation characteristics of the overmold in a disc drive having a single disc.

Several tests were performed to determine the heat dissipation from disc drives with different types of overmold material. The temperature of the coil was measured as a function of time for 90 seconds. FIG. 3 shows the test results for a particular one-disc disc drive plotted against an elapsed time x-axis 140 and a temperature (degrees Celsius) y-axis 142. For the tests indicated by temperature curve 144, a base resin of polyphenylene sulfide (PPS) was filled with 20% glass by mass. This is a type of overmold material known in the prior art and this overmold material has a thermal conductivity of 0.3 W/m-°K.

Curve 148 denotes a test using an overmold material (composition "C") having a PPS base resin (45% by mass) and a ceramic compound filler of boron nitride (40% by mass), mixed with glass fiber (15% by mass). Curve 146 denotes a test using an overmold material (composition "G") having a PPS base resin (45% by mass) and a ceramic compound filler of boron nitride (35% by mass), mixed with glass fiber (20% by mass).

It can be observed from FIG. 3 that, of the compositions tested, both compositions C and G provide significantly better results than the prior art composition.

Figure 4:
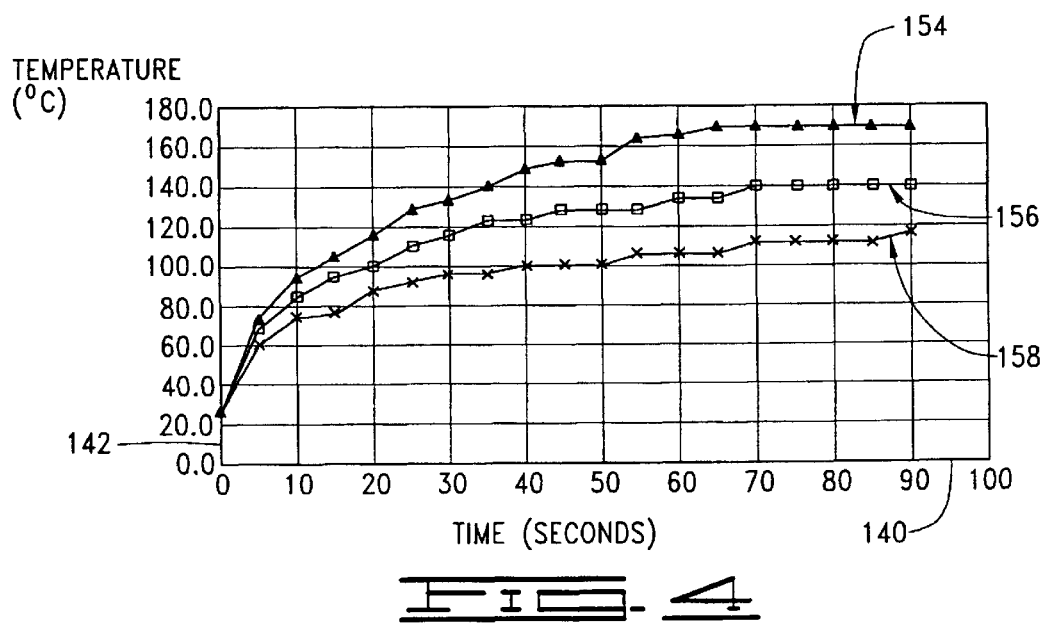
FIG. 4 is a plot of time versus temperature for a test to evaluate the heat dissipation characteristics of the overmold in a disc drive having two discs.

FIG. 4 shows the test results for a 2-disc disc drive using overmolds of the above composition. Curve 154 shows the results for the prior art composition, curve 158 shows the results for composition C and curve 156 shows the results for composition G. As before, composition C was found to provide the best results of those tested. Both compositions C and G preformed significantly better than the prior art. Further tests have indicated that the use of both compositions C and G significantly reduced off-track errors due to popping.

Accordingly, a thermally conducting and electrically insulating overmold (such as 120) is provided for a disc drive (such as 100). The overmold is made from a base resin mixed with a ceramic filler compound. In some preferred embodiments, the ceramic filler compound is chosen from a group of compounds that include boron nitride, alumina, aluminum nitride, magnesium oxide, zinc oxide, silicon carbide, beryllium oxide, chromium oxide or some combination thereof. In some preferred embodiments, the base resin is compound chosen from a group of compounds including polyethylene naphthalate, polyethylene terephthalate, polybutylene terephthalate, polyamide, polyphthalamide, polypheneline sulfide, polycarbonates, polyetheretheketones and polyphenyline oxide. In some embodiments, the overmold includes a coupling agent. The presence of thermally conductive material in the overmold helps to eliminate popping because the overmold conducts heat away from the coil at a higher rate of heat transfer as compared to overmolds without thermally conductive material.

For purposes of the appended claims, the term overmold will be understood consistent with the foregoing discussion to describe a structure (such as 120) which encapsulates and supports an actuator coil (such as 118). The overmold has an inner bobbin portion (such as 122) within the coil and an outer portion (such as 124) which extends an exterior of the coil. The term encapsulate will be understood as contactingly surrounding at least two opposing sides of an actuator coil and does not necessarily require contact on all sides of the actuator coil.

For purposes of the appended claims, the recited function performed by the "first means" will be understood to be carried out by the overmold 120 formed in accordance with the various embodiments of base resin and ceramic filler compound compositions disclosed above. Prior art compounds such as the prior art composition of polyphenylene sulfide and glass fiber, discussed with reference to FIGS. 3 and 4, do not perform the recited function and are explicitly excluded from the scope of the claims and are explicitly excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the overmold without departing from the spirit and scope of the present invention.

In addition, although the embodiments described herein are directed to an overmold for a disc drive actuator assembly, it will be appreciated by those skilled in the art that the overmold can be used for other devices without departing from the spirit and scope of the claimed invention.

What is claimed is:

1. An overmold for a disc drive actuator assembly to encapsulate and support an actuator coil made from an overmold material comprising:
   a base resin chosen from a group of base resins consisting of liquid crystal polymer, polyethylene naphthalate, polyethlene terephthalate, polybutylene terephthalate, polyamide, polyphthalamide, polypheneline sulfide, polycarbonates, polyetheretheketones and polyphenyline oxide; and
   a ceramic filler compound blended with the resin and chosen from a group of ceramic filler compounds consisting of boron nitride, alumina, aluminum nitride, magnesium oxide, zinc oxide, silicon carbide, beryllium oxide and chromium oxide.

2. The overmold of claim 1 further comprising glass mixed with the resin and the ceramic filler compound.

3. The overmold of claim 1 wherein the ceramic filler compound further comprises a mixture of ceramic filler compounds chosen from the group of ceramic filler compounds.

4. The overmold of claim 1 wherein the ceramic filler compound is present in the overmold material in a mass concentration of 25% to 90%.

5. The overmold of claim 1 wherein the base resin comprises liquid crystal polymer.

6. The overmold of claim 1 wherein the base resin is present in the overmold material in a mass concentration of 10% to 75%.

7. The overmold of claim 1 wherein the overmold material further comprises a coupling agent.

8. The overmold of claim 7 wherein the coupling agent is present in the overmold material in a mass concentration of 0.1% to 5%.

9. The overmold of claim 7 wherein the coupling agent is chosen from a class of coupling agents consisting of neoalkoxy titanate or monoalkoxy titanate.

10. The overmold of claim 1 wherein the overmold material has a thermal conductivity of at least 0.40 W/m-°K.

11. A disc drive, comprising:
    a rotatable disc;
    an actuator assembly comprising a read/write head supported adjacent the disc and an actuator coil to which current is applied to rotate the actuator assembly; and first means for encapsulating and supporting the actuator coil to reduce head position errors due to thermal expansion and contraction of the actuator coil.

12. The disc drive of claim 11 wherein the first means comprises an overmold formed from a bas resin and a ceramic filler compound blended with the resin, wherein the base resin is chosen from a group of base resins consisting of liquid crystal polymer, polyethylene naphthalate, polyethylene terephthalate, polybutylene terephthalate, polyamide, polypthalamide, polypheneline sulfide, polycarbonates, polyetheretheketones and polyphenyline oxide, and wherein the ceramic filler compound is chosen from a group of ceramic filler compounds consisting of boron nitride, alumina, aluminum nitride, magnesium oxide, zinc oxide, silicon carbide, beryllium oxide and chromium oxide.

13. The disc drive of claim 12 wherein the overmold further comprises glass mixed with the resin and the ceramic filler compound.

14. The disc drive of claim 12 wherein the ceramic filler compound further comprises a mixture of ceramic filler compounds chosen from the group of ceramic filler compounds.

15. The disc drive of claim 12 wherein the ceramic filler compound is present in the overmold in a mass concentration of 25% to 90%.

16. The disc drive of claim 12 wherein the base resin comprises liquid crystal polymer.

17. The disc drive of claim 12 wherein the base resin is present in the overmold material in a mass concentration of 10% to 75%.

18. The disc drive of claim 12 wherein the overmold material further comprises a coupling agent.

19. The disc drive of claim 12 wherein the overmold material has a thermal conductivity of at teas 0.40 W/m-°K.

20. An overmold for a disc drive actuator assembly which encapsulates and supports an actuator coil made from an overmold material comprising:

a base resin formed from polypheneline sulfide; and a ceramic filler compound blended with the base resin and formed from boron nitride.

21. The overmold of claim 20, wherein the base resin is present in the overmold material in a mass concentration of over about 40%.

22. The overmold of claim 20, further comprising glass mixed with the base resin and the ceramic filler compound.

23. The overmold of claim 22, wherein the base resin has a mass concentration of about 45%, the ceramic filler compound has a mass concentration of about 40% by mass, and the glass has a mass concentration of about 15%.

24. The overmold of claim 22, wherein the base resin has a mass concentration of about 45%, the ceramic filler compound has a mass concentration of about 35% by mass, and the glass has a mass concentration of about 20%.

25. the overmold of claim 20, further comprising a coupling agent blended with the base resin an the ceramic filler compound.

26. The overmold of claim 25, wherein the coupling agent is present in the overmold material in a ass concentration of 0.1% to 5%.

27. The overmold of claim 25, wherein the coupling agent is chosen from a class of coupling agent consisting of neoalkoxy titanate or monoalkoxy titanate.

28. The overmold of claim 20 wherein the overmold material has a thermal conductivity of at least 0.40 W/m-°K.

* * * * *